US 12,240,466 B2

United States Patent
Kuehnle et al.

(10) Patent No.: US 12,240,466 B2
(45) Date of Patent: Mar. 4, 2025

(54) SYSTEM AND METHOD FOR IDENTIFYING A CHANGE IN THE OPERATOR OF A VEHICLE

(71) Applicant: RM ACQUISITION, LLC, Boise, ID (US)

(72) Inventors: Andreas U. Kuehnle, Villa Park, CA (US); Shaun M. Howard, Irvine, CA (US)

(73) Assignee: RM ACQUISITION, LLC, Chicago, IL (US)

( * ) Notice: Subject to any disclaimer, the term of this patent is extended or adjusted under 35 U.S.C. 154(b) by 251 days.

(21) Appl. No.: 17/841,725

(22) Filed: Jun. 16, 2022

(65) Prior Publication Data
US 2023/0406321 A1 Dec. 21, 2023

(51) Int. Cl.
*B60W 40/08* (2012.01)
*B60W 50/08* (2020.01)
*G07C 9/00* (2020.01)
*G07C 9/30* (2020.01)
*G07C 9/37* (2020.01)

(52) U.S. Cl.
CPC ............ *B60W 40/08* (2013.01); *B60W 50/08* (2013.01); *G07C 9/00* (2013.01); *G07C 9/30* (2020.01); *G07C 9/37* (2020.01); *B60W 2040/0809* (2013.01); *B60W 2040/0881* (2013.01)

(58) Field of Classification Search
None
See application file for complete search history.

(56) References Cited

U.S. PATENT DOCUMENTS

| | | |
|---|---|---|
| 6,938,159 B1 | 8/2005 | O'Connor et al. |
| 7,587,068 B1 | 9/2009 | Steinberg et al. |
| 8,344,849 B2 | 1/2013 | Larsson et al. |
| 8,705,808 B2 | 4/2014 | Determan et al. |
| 9,272,689 B2 | 3/2016 | Fung et al. |
| 9,855,919 B2 | 1/2018 | Basir et al. |
| 10,124,729 B2 | 11/2018 | Lee |
| 10,204,261 B2 | 2/2019 | Haley |
| 10,572,745 B2 | 2/2020 | Kuehnle et al. |

(Continued)

OTHER PUBLICATIONS

Khan et al., "Biometric Scanning Based on Vehicle Ignition System," 7 International Journal of Engineering Science and Computeing No. 3 (Mar. 2017).

(Continued)

*Primary Examiner* — Carlos Garcia
(74) *Attorney, Agent, or Firm* — MARSHALL, GERSTEIN & BORUN LLP

(57) ABSTRACT

A system for identifying a change in the operator of a vehicle includes a controller configured to determine, during operation of the vehicle by a current operator of the vehicle over a period of time, a plurality of values for at least two variables associated with the current operator. The controller correlates the values for the two variables to form a plurality of data points which together form a point cloud associated with the current operator. The controller performs a comparison of the point cloud to a point cloud stored in a memory and associated with a prior operator of the vehicle and determines, responsive to the comparison, whether the current operator of the vehicle is the prior operator of the vehicle.

20 Claims, 10 Drawing Sheets

(56) References Cited

U.S. PATENT DOCUMENTS

| | | | |
|---|---|---|---|
| 11,188,769 | B2 | 11/2021 | Kuehnle et al. |
| 11,951,995 | B2 * | 4/2024 | Kuehnle ............ G06Q 10/0639 |
| 2006/0204059 | A1 | 9/2006 | Ido et al. |
| 2015/0025705 | A1 | 1/2015 | Burger |
| 2018/0053061 | A1 | 2/2018 | Wulf |
| 2019/0147271 | A1 | 5/2019 | Tanaka et al. |
| 2022/0324461 | A1 * | 10/2022 | Kuehnle ............ G01C 21/3617 |

OTHER PUBLICATIONS

Summary Description of Biometric Vehicle Access System Market by Authentication Type (Fingerprint, Voice, Future Technology (Iris Recognition System), Vehicle Type (Passenger Car, Battery Electric Vehicle, and Region—Global Forecast to 2021 (Dec. 2016) from https://www.marketsandmarkets.com/Market-Reports/biometric-vehicle-access-system-market-34162390.html (downloaded Jun. 16, 2022).
Bendix Commercial Vehicle Systems LLC, "SafetyDirect by Bendix CVS," (2012).
English (machine) translation of CN 102054160 B.
English (machine) translation of CN 102156854 A.
English (machine) translation of CN 107092881 B.
English (machine) translation of CN 107679493 A.
English (machine) translation of CN 109249895 A.
English (machine) translation of DE 10119959 A1.
English (machine) translation of JP 4986135 B2.
English (machine) translation of JP 2015-071319 A.

* cited by examiner

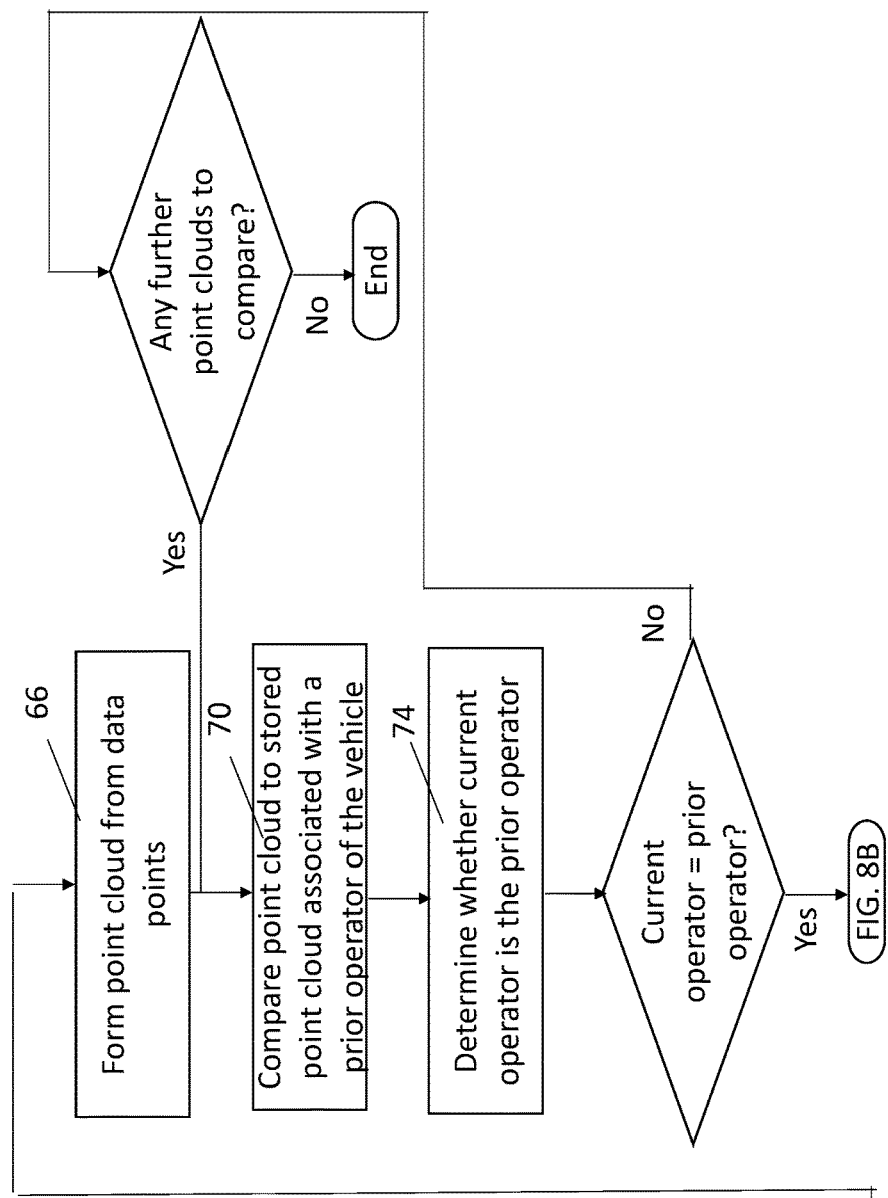

SYSTEM AND METHOD FOR IDENTIFYING A CHANGE IN THE OPERATOR OF A VEHICLE

BACKGROUND OF THE INVENTION a. Field of the Invention

This invention relates to systems and method for monitoring the operation of a vehicle by an operator of the vehicle. In particular, the invention relates to a system and method for identifying a change in the operator of the vehicle so that information relating to the operation of the vehicle can be associated with the correct operator.

b. Background Art

Commercial vehicle fleets employ large numbers of drivers or operators to operate vehicles within the fleet. In order to protect the vehicles, the loads carried by the vehicles, and people and property within the environments in which the vehicles are operating, it is desirable for fleet managers to be able to monitor the operation of vehicles in order to assess the performance of the vehicles and the performance of individual vehicle operators. As a result, a variety of systems have been developed that allow fleet managers to monitor the operation of a vehicle and the behaviors of operators of the vehicle. The applicant Bendix Commercial Vehicle Systems LLC, for example, offers a monitoring system under the registered trademark "SAFETYDIRECT" that collects data from the vehicle and generates information regarding operation of the vehicle and the behaviors of operators of the vehicle. This information can then be used by fleet managers for a variety of purposes including assessing vehicle operators, correcting and/or rewarding operator behavior and tailoring operator education and training to address particular operating habits.

In order to make use of the data generated by conventional monitoring systems, fleet managers must be able to correlate the data generated by the monitoring system with individual vehicle operators. Correlating the data with individual vehicle operators, however, is not always straightforward. Over any given period of time, each vehicle may be operated by different operators as the vehicle makes different trips. Further, it is not uncommon for multiple operators to be employed to operate a vehicle making a single trip over a long distance due to safety laws limiting daily operating times for individual operators. It is therefore important to be able to identify when a change in the operator of a vehicle occurs so that data generated by the monitoring system can be accurately correlated with individual vehicle operators.

Conventional systems used to identify a change in the operator of a vehicle have a number of disadvantages. Historically, fleet managers relied on papers logs filled out by vehicle operators. Self-reporting by vehicle operators, however, is subject to significant errors—both as a result of unintentional mistakes and intentional deception. Most commercial vehicles now include an electronic logging device (ELD or E-log) that records various vehicle parameters (e.g., hours of operation) and entries relating to an operator's record of duty status (RODS). Vehicle operators are supposed to log in and out using the ELD during each time period the vehicle is operating. Not all vehicles have ELDs, however, and they are not always used, or used correctly, even when available. Similarly, while some commercial vehicles are equipped with biometric systems (e.g., facial recognition systems) for identifying operators and monitoring operator behavior, such systems are not present on many vehicles and, even when present, may be disabled by fleet managers as a reward for good performance or by the vehicle operator through tampering (e.g., by covering a camera of a facial recognition system).

The inventors herein have recognized a need for a system and method for identifying a change in the operator of the vehicle that will minimize and/or eliminate one or more of the above-identified deficiencies.

BRIEF SUMMARY OF THE INVENTION

This invention relates to systems and method for monitoring the operation of a vehicle by an operator of the vehicle. In particular, the invention relates to a system and method for identifying a change in the operator of the vehicle so that information relating to the operation of the vehicle can be associated with the correct operator.

A system for identifying a change in the operator of a vehicle in accordance with one embodiment includes a memory and a controller. The controller is configured to determine, during operation of the vehicle by a current operator of the vehicle over a period of time, a plurality of values for a first variable associated with the current operator. The controller is further configured to determine, during operation of the vehicle by the current operator of the vehicle over the period of time, a plurality of values for a second variable associated with the current operator. The controller is further configured to correlate each of the plurality of values for the first variable with a corresponding value of the plurality of values for the second variable to form a plurality of data points, the plurality of data points forming a first point cloud associated with the current operator. The controller is further configured to perform a comparison between the first point cloud and a second point cloud stored in the memory. The second point cloud is associated in the memory with a prior operator of the vehicle. The controller is further configured to determine, responsive to the comparison, whether the current operator of the vehicle is the prior operator of the vehicle.

An article of manufacture in accordance with one embodiment includes a non-transitory computer storage medium having a computer program encoded thereon that when executed by a controller identifies a change in the operator of a vehicle. The computer program includes code for determining, during operation of the vehicle by a current operator of the vehicle over a period of time, a plurality of values for a first variable associated with the current operator. The computer program further includes code for determining, during operation of the vehicle by the current operator of the vehicle over the period of time, a plurality of values for a second variable associated with the current operator. The computer program further includes code for correlating each of the plurality of values for the first variable with a corresponding value of the plurality of values for the second variable to form a plurality of data points, the plurality of data points forming a first point cloud associated with the current operator. The computer program further includes code for performing a comparison between the first point cloud and a second point cloud stored in a memory, the second point cloud associated in the memory with a prior operator of the vehicle. The computer program further includes code for determining, responsive to the comparison, whether the current operator of the vehicle is the prior operator of the vehicle.

A method for identifying a change in the operator of a vehicle in accordance with one embodiment includes the step of determining, during operation of the vehicle by a current operator of the vehicle over a period of time, a plurality of values for a first variable associated with the current operator. The method further includes the step of determining, during operation of the vehicle by the current operator of the vehicle over the period of time, a plurality of values for a second variable associated with the current operator. The method further includes the step of correlating each of the plurality of values for the first variable with a corresponding value of the plurality of values for the second variable to form a plurality of data points, the plurality of data points forming a first point cloud associated with the current operator. The method further includes the step of performing a comparison between the first point cloud and a second point cloud stored in a memory, the second point cloud associated in the memory with a prior operator of the vehicle. The method further includes the step of determining, responsive to the comparison, whether the current operator of the vehicle is the prior operator of the vehicle.

A system and method for identifying a change in the operator of a vehicle in accordance with the present teachings represents an improvement as compared to conventional systems and methods. In particular, the system and method are not dependent on operator use of paper or electronic logging devices to identify changes in the driver. The system and method also allow identification of a change in the operator in vehicles where electronic logging devices and/or or biometric identification systems are not available or have been disabled.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 8A-B are flowcharts illustrating another embodiment of a method for identifying a change in the operator of a vehicle in accordance with the present teachings.

DETAILED DESCRIPTION OF THE INVENTION

Figure 1:
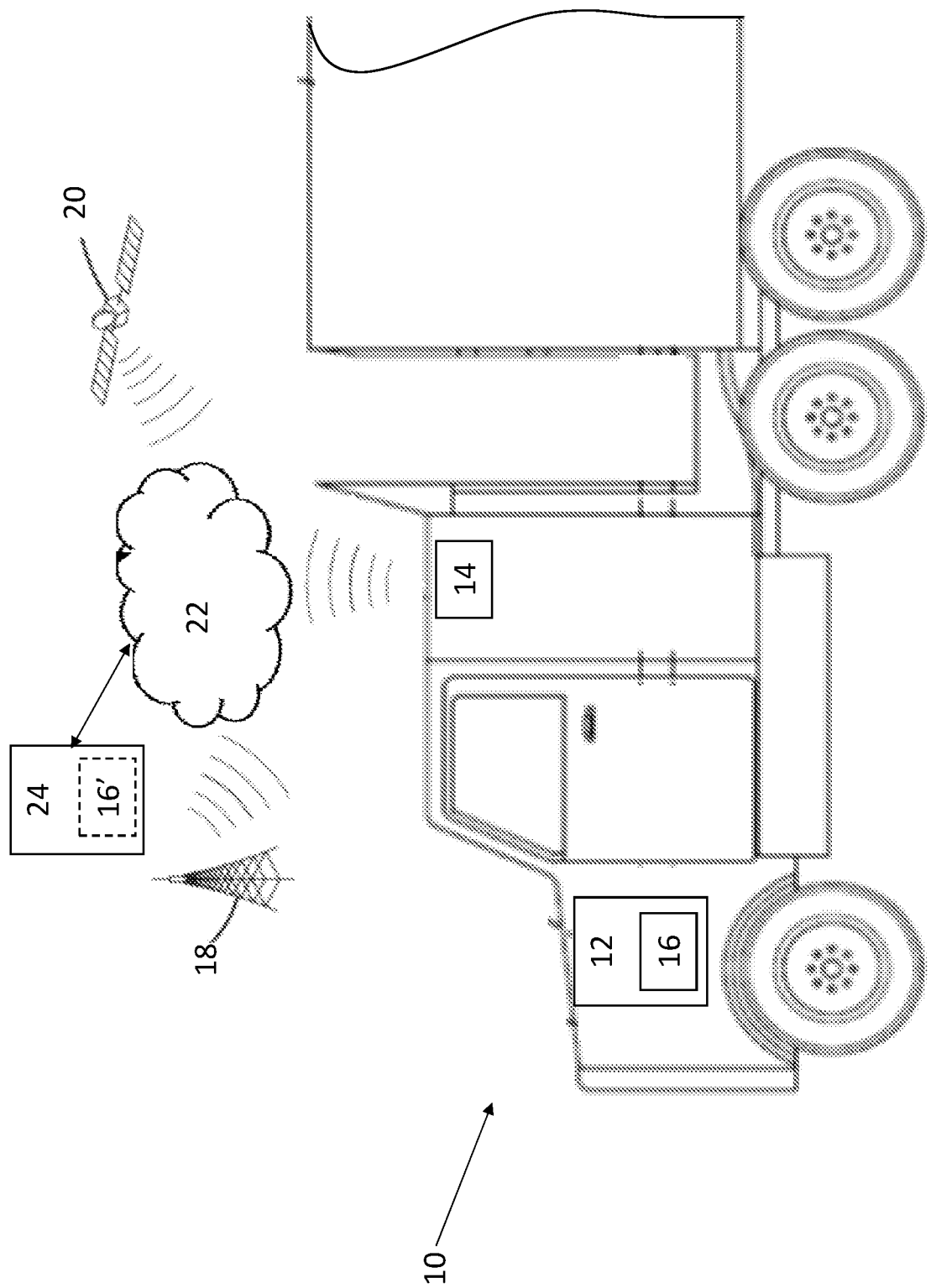
FIG. 1 is a diagrammatic view of a vehicle incorporating a system for identifying a change in the operator of the vehicle in accordance with the present teachings.

Referring now to the drawings wherein like reference numerals are used to identify identical components in the various views, FIG. 1 illustrate a vehicle 10 incorporating a system for identifying a change in the operator of vehicle 10 in accordance with the present teachings. In the illustrated embodiment, vehicle 10 comprises a tractor-trailer (also referred to as a semi). It should be understood, however, that the system and method disclosed herein could be used in other types of vehicles including, for example, other commercial vehicles such as buses or off-road vehicles and in non-commercial vehicles such as automobiles. In addition to conventional systems for use in operating vehicle 10 such as power generating and distribution systems, steering systems, braking systems, access control systems, etc., vehicle 10 may include a monitoring system 12 for monitoring the operation of the vehicle 10 and the behavior of operators of vehicle 10 and a telecommunications system 14 for transmitting information to, and receiving information from, locations remote from the vehicle 10. In accordance with the present teachings, vehicle 10 further includes a system 16 for identifying a change in the operator of vehicle 10 so that information obtained by system 12 can be associated with the correct operator of vehicle 10.

System 12 is provided for monitoring the operation of vehicle 10 and the behavior of operators of vehicles 10. System 12 may, for example comprise the system offered by Applicant under the registered trademark "SAFETY-DIRECT" which records safety related events such as speeding, unintentional lane departures, and loss of vehicle stability. System 12 may be configured to gather and record information from a variety of individual sensors on vehicle 10 such as wheel speed sensors, acceleration sensors, yaw rate sensors, and steer angle sensors and from a variety of systems on vehicle 10 such as collision avoidance systems, stability control systems, anti-lock braking systems, tire pressure monitoring systems and lane departure warning systems. The information may be gathered and recorded in response to specific episodes or events (e.g., those indicating a potential safety risk) and/or on a regular basis (constantly or at predetermined time intervals) without reference to a specific episode or event. System 12 may be configured to process some or all of the information to generate additional information regarding the operation of vehicle 10 and the behavior of operators of vehicle 10. System 12 may provide some or all of the information gathered and/or generated by system 12 to the vehicle operator through one more conventional user interfaces including display screens, surface projections and audio, visual or haptic indicators. System 12 may also transmit some or all of the information gathered and/or generated by system 12 to locations remote from vehicle 10 through telecommunications system 14 for various purposes including assessment of the operation of vehicle 10 and the behavior of operators of vehicle 10 by fleet managers.

Telecommunications system 14 enables communication between vehicle 10 and other vehicles (V2V communication), road infrastructure (V2I communication) and end users (e.g., fleet managers and vehicle service providers) overs various telecommunications networks. System 14 enables wireless voice and/or data communication over a wireless carrier system and via wireless networking. In some embodiments, system 14 may comprise or form a part of a vehicle telematics unit used to provide a diverse range of services including turn-by-turn directions and other navigation-related services that are provided in conjunction with a GPS-based vehicle navigation system, airbag deployment or collision notification and other emergency or roadside assistance-related services, and diagnostic reporting using information obtained from various vehicle control systems.

System 14 may include a short-range wireless communication transceiver for communicating with systems on vehicle 10 including systems 12 and 16 and for communication with other vehicles and road infrastructure that are configured for communication over a relatively short distance using short-range wireless technologies such as Wi-Fi (IEEE 802.11), WiMAX, Wi-Fi direct, Bluetooth, Zigbee, near field communication (NFC), etc. and that transmit and receive signals through an antenna. The transceiver may be configured to allow vehicle to vehicle communication in accordance with Society of Automotive Engineering (SAE) Standard J2945 directed to Dedicated Short Range Communication. Alternatively, on-board vehicle systems such as systems 12 and 16 may communicate with system 14 over a conventional vehicle communications bus such as a controller area network (CAN) or local interconnect network (LIN) bus.

System 14 may further include a long-range wireless communication transceiver that is configured for communication over longer distances through a cellular communications network 18 or satellite communication network 20 for vehicle navigation, diagnostic reporting, fleet management and other purposes. The transceiver may, for example, be configured for cellular communication according to either GSM, CDMA, UMTS or LTE standards and therefore include a standard cellular chipset for voice communications, a wireless modem (not shown) for data transmission, and a radio transceiver that transmits signals to and receives signals from a dual antenna for wireless communication with network 18. Using communication networks 18, 20, system 14 may be connected to a telecommunications network 22 and, through network 22, to various computing devices 24 including those used in fleet management of vehicle 10 and other vehicles in a fleet. Network 22 may include a public switched telephone network (PSTN) such as that used to provide hardwired telephony, packet-switched data communications, and the Internet infrastructure. One or more segments of network 22 could be implemented through the use of a standard wired network, a fiber or other optical network, a cable network, power lines, other wireless networks such as wireless local area networks (WLANs), or networks providing broadband wireless access (BWA), or any combination thereof. Computing devices 24 may comprise, for example, servers (including file servers, web servers, or network address servers) or client computing devices and may be used for a wide variety of purposes including, for example, accessing or receiving vehicle data for use in diagnosing and servicing vehicle 10, setting up or configuring vehicle 10, controlling vehicle functions and connecting the vehicle operator to human advisors, automated voice response systems, databases, and the like used in providing, for example, information, emergency or roadside assistance services and vehicle diagnostic services. In accordance with one aspect of the present teachings, computing devices 24 may be used by fleet managers to gather information from system 16 regarding the identities of operators of vehicle 10 for use in associating data regarding operator performance with the correct operator.

System 16 is provided to identify a change in the operator of vehicle 10. In some embodiments, system 16 may further be used to identify the particular operator of vehicle 10. In the illustrated embodiment, system 16 is shown as a part of system 12. System 16 may, however, be separate from system 12 and communicate with system 12 over a vehicle communications bus or wireless network. In the illustrated embodiment, system 16 is also shown as being on board vehicle 10. In an alternative embodiment, however, certain components of system 16 may be implemented in one or more computing devices 24 remote from vehicle 10 or the functionality of certain components of system 16 may be shared between components of vehicle 10 and components of one or more computing devices 24 as indicated by the dashed box 16'.

Figure 2:
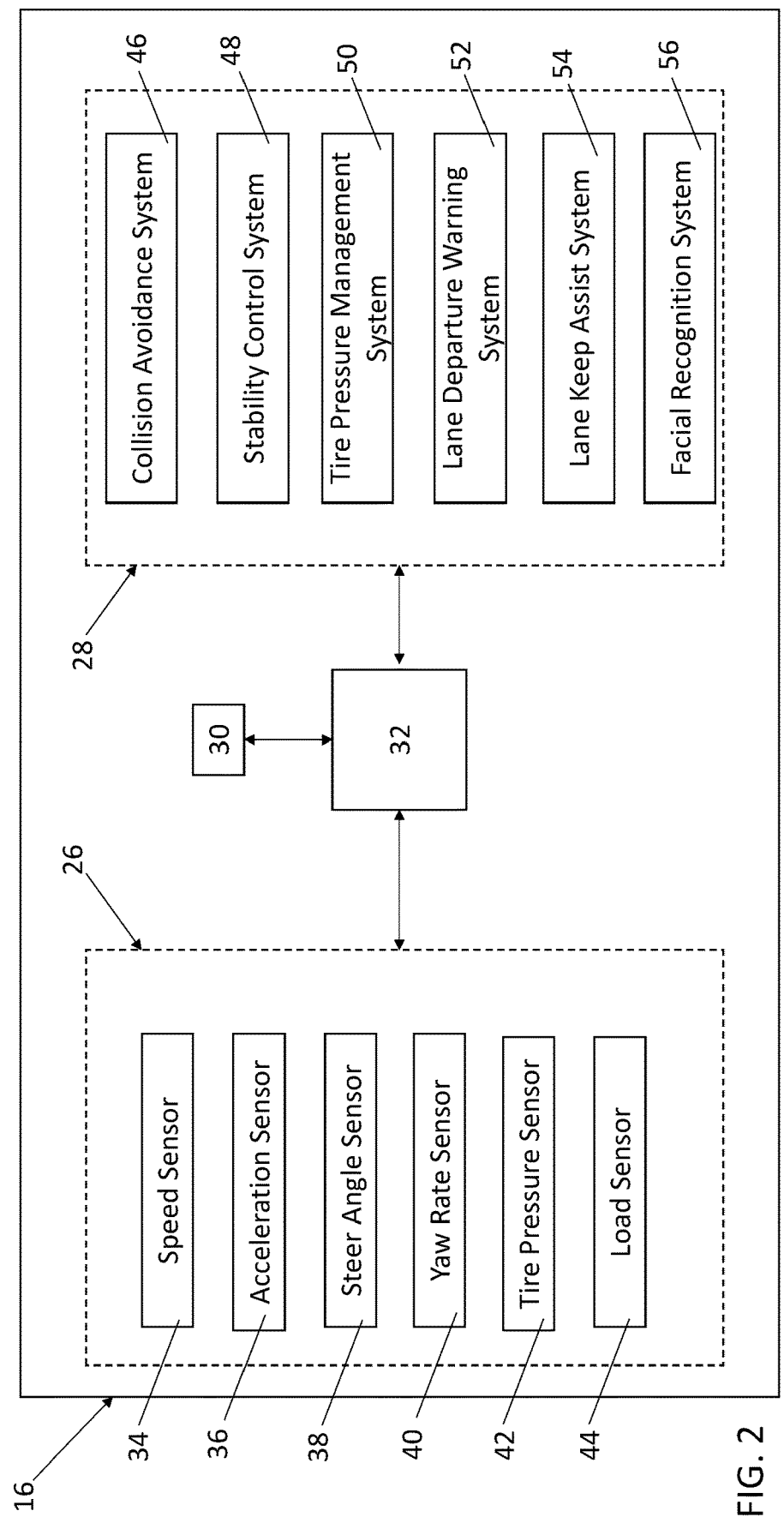
FIG. 2 is a diagrammatic view of a system for identifying a change in the operator of a vehicle in accordance with the present teachings.

Referring now to FIG. 2, system 16 may include sensors 26 and systems 28 that provide information regarding a plurality of variables associated with the operator of the vehicle including information regarding the operation of vehicle 10 by the operator and information regarding the identity, actions and movements of the operator. System 16 may further include a memory 30 and a controller 32. One or both of memory 30 and controller 32 may be located on vehicle 10, computing device 24 or a combination of the two. Further the functionality of controller 32 described hereinbelow may be divided between controllers on vehicle 10 and computing device 24.

Sensors 26 are provided to measure or sense values or states associated with various operating conditions for vehicle 10 and/or the identity, actions and movements of the operator of vehicle 10 and to generate sensor signals indicative of those values or states. In accordance with one aspect of the present teachings, sensors 26 provide information to controller 32 regarding variables associated with the operator of vehicle 10 including variables associated with operation of vehicle 10 by the operator and variable associated with the identity, actions or movements of the operator of vehicle 10. Sensors, 26, may, for example, include a wheel speed sensor 34 that generates a signal indicative of the rotational speed of a wheel on vehicle 10 and, therefore, the speed of vehicle 10, an acceleration sensor 36 that generates a signal indicative of the acceleration or deceleration of vehicle 10, a steer angle sensor 38 that generates a signal indicative of the steer angle of vehicle 10, a yaw rate sensor 40 that generates a signal indicative of the speed of rotation of vehicle 10 about a vertical axis, a tire pressure sensor 42 that generates a signal indicative of the pressure of one or more tires on vehicle 10, and a load sensor 44 that generates a signal indicative of the load on a trailer of vehicle 10. It should be understood that the sensors 34, 36, 38, 40, 42, and 44 are exemplary and that sensors may be used to generated signals indicative of a variety of variables associated with the operation of vehicle 10 and/or the identity, actions or movements of the operator of vehicle 10 including, for example, the position (angle) of the gas pedal in vehicle 10, actuation of the brake pedal in vehicle 10, the yaw angle of vehicle 10, the distance of vehicle 10 from lane markings for a lane of travel of the vehicle 10, the curvature of the road on which vehicle is travelling or the lane of travel on the road, the presence of and/or content (e.g., speed limits) on road signs as detected by a camera on vehicle 10, a following distance or relative speed between vehicle 10 and another vehicle in front of vehicle 10. Signals generated by sensor 26 may be provided directly to system 16, but also may be provided to and used by one or more of systems 28.

Systems 28 likewise provide information to controller 10 regarding variables associated with the operator of vehicle 10 including variables associated with operation of vehicle 10 by the operator and variable associated with the identity, actions or movement of the operator of vehicle Systems 28 may, for example, include a collision avoidance system 46 that uses RADAR, LIDAR or similar sensors to determine the distance between vehicle 10 and other vehicles, pedestrians and road infrastructure, an anti-locking braking system and/or stability control system 48 that detect a loss of traction in vehicle 10, a tire pressure monitoring system 50 that detects an abnormal tire pressure, a lane departure warning system 52 that detects when vehicle 10 is drifting out of a lane of travel, and a lane keep assist system 54 that assists in maintaining the vehicle 10 within a lane of travel. Systems 28 may further include systems (not shown) monitoring usage of individual vehicle components such as seat belts, turn signals and head lights. Systems 28 may further include biometric identification systems such as a facial recognition system 56 having a camera configured to capture images of the operator of vehicle 10 and the interior of the cabin in vehicle 10 (sometimes referred to as a driver facing camera). As noted above, systems 28 may use information received from sensors 26 to derive values for variables associated with the operator of vehicle 10 including variables associated with operation of vehicle 10 by the operator and variable associated with the identity, actions or movement of the operator of vehicle 10. In some cases, systems 28 may combine information from multiple sensors 26 to derive values for certain variables. For example, a system 28 may uses sensor outputs indicative of activation of a turn signal by the operator of vehicle 10 and indicative of the distance between the vehicle 10 and a lane marker on a lane of travel for vehicle 10 to determine the time between activation of the turn signal and crossing of the lane marker. In another embodiment, a system 28 may use sensor outputs indicative of the posted speed limit on a road sign and the vehicle speed to determine the time between identification of a change in the speed limit and when the vehicle reaches the new speed limit. Systems 28 may also derive values for variables indicative of trends over time such as whether a speed of vehicle 10 increases or decreases over a section of road with the same or similar speed limits or whether the speed of vehicle 10 changes as the length of a trip by vehicle 10 increases (with a decrease indicating potential fatigue for the operator).

Memory 30 may be provided to store data, data structures, software, firmware, programs, algorithms, scripts, and other electronic instructions. In accordance with one aspect of the present teachings, memory 30 may be provided to store data obtained from sensors 26, systems 28 and controller 32. In accordance with another aspect of the present teachings and as discussed in greater detail below, memory 30 may be configured to store multi-dimensional point clouds comprising a plurality of points correlating values for multiple variables associated with the operator of vehicle 10 including variables associated with operation of vehicle 10 by the operator and variable associated with the identity, actions or movements of the operator of vehicle 10. Memory 30 may be further configured to associate each point cloud with an operator of vehicle 10 in a conventional data structure such as a look up table. In accordance with yet another aspect of the present teachings, memory 30 may also be provided to store programming instructions (i.e., software or a computer program) to implement a method for identifying a change in the operator of vehicle 10 as discussed in greater detail below. Memory 30 may comprise a semiconductor memory device and may comprise a combination of volatile (e.g., random-access memory (RAM), dynamic random-access memory (DRAM), or static random-access memory (SRAM)) and non-volatile memory (e.g., read only memory (ROM), programmable read only member (PROM), erasable programmable read only memory (EPROM), electrically erasable programmable read only memory (EEPROM), flash memory) and may comprise a combination of permanent and rewritable memory. Although memory 30 is illustrated in FIG. 2 as being external to controller 32, it should be understood that memory 30 may be contained within controller 32.

Controller 32 is provided to gather information regarding the operation of vehicle 10 by each operator of vehicle 10 and to use that information to identify changes in the operator for vehicle 10 and, in some embodiments, to identify the operator of vehicle 10. Controller 32 may comprise a programmable microprocessor or microcontroller or may comprise an application specific integrated circuit (ASIC). In certain embodiments, controller 32 may include a memory (such as memory 30), a central processing unit (CPU), and an input/output (I/O) interface including a plurality of input/output pins or terminals through which controller 32 may receive a plurality of input signals and transmit a plurality of output signals. The input signals may include signals from sensors 26, systems 28, and memory 30. The output signals may include signals to telecommunications systems 14, sensors 26, systems 28, and memory 30. The output signals may further include signals to user interface elements in vehicle 10 including display screens, surface projectors, and audio, visual and haptic indicators.

Figure 3:
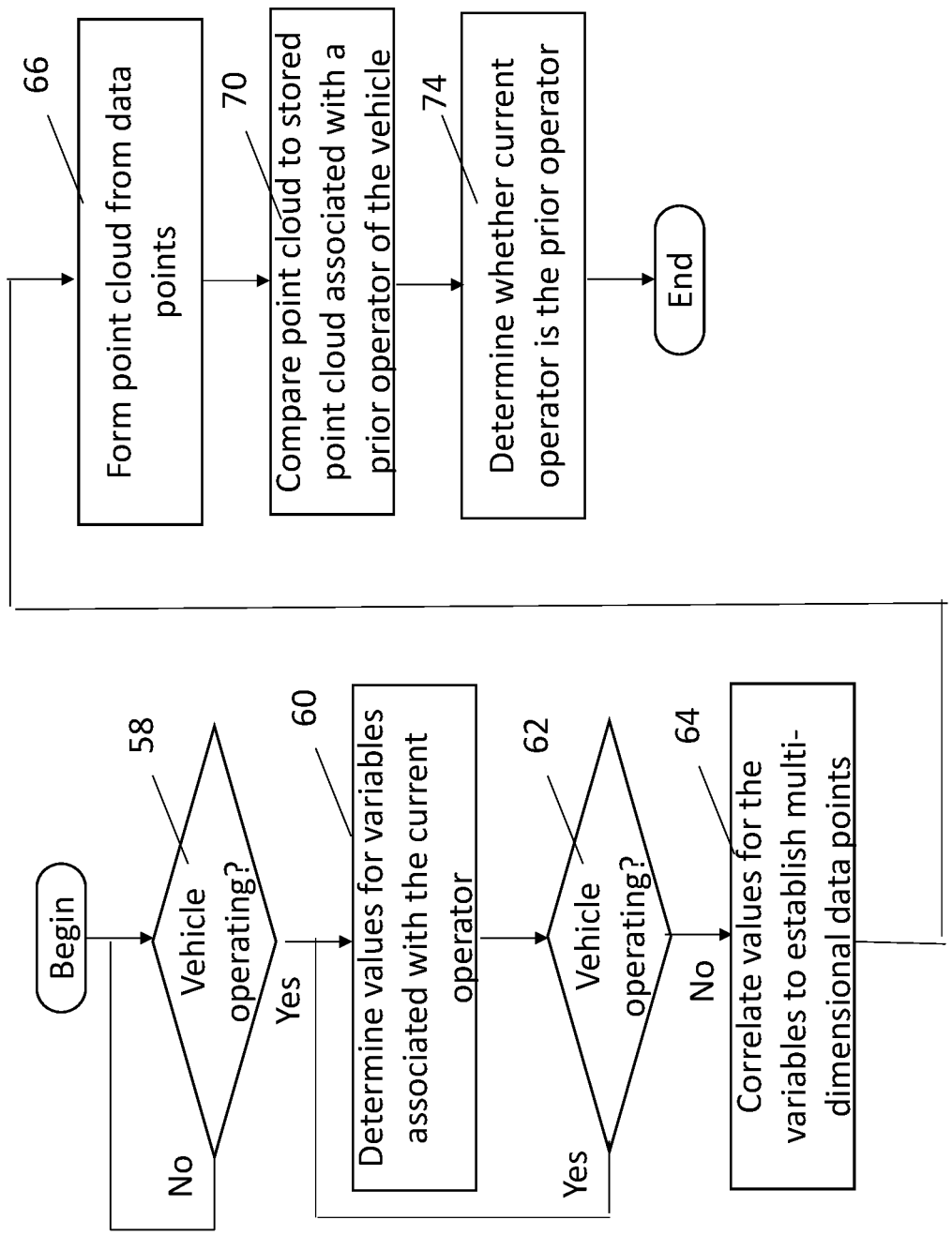
FIG. 3 is a flowchart illustrating one embodiments of a method for identifying a change in the operator of a vehicle in accordance with the present teachings.

Controller 32 may be configured with appropriate programming instructions (i.e., software or a computer program) to implement a method for identifying a change in the operator of vehicle 10. Referring now to FIG. 3, the method may begin with the step 58 of identifying a start of operation of vehicle 10 by the current operator of vehicle 10. In general, it may be assumed that a change in the identity of the operator of vehicle 10 can only occur in the period after operation of vehicle 10 ends and before operation of vehicle 10 starts again. Therefore, system 16 may use the start of operation of vehicle 10 to initiate the remaining steps of the method for identifying a change in the identity of the operator of vehicle 10. System 16 may identify the start of operation of vehicle 10 in a variety of ways. For example, controller 32 may detect a change in state of vehicle 10 indicative of the start of operation of vehicle 10 such as the activation of a power source on vehicle 10 (e.g., the ignition of an engine) as indicated by a current or voltage sensor. System 16 may also identify movement of vehicle 10 through global positioning satellite (GPS) data from a navigation system in vehicle 10 or a change in vehicle speed or acceleration as indicated by wheel speed sensor 34 or acceleration sensor 36, respectively.

The method may continue with the step 60 of determining values for a plurality of variables associated with the current operator of vehicle 10 during operation of vehicle 10 by the current operator over a period of time. The period of time may comprise, for example, the time between the start of operation of vehicle 10 and the end of operation of vehicle 10 by the current operator. Alternatively, the period of time may comprise a portion of the time between the start and end of operation of vehicle 10. For example, the period of time may begin after a predetermined period of time has passed following the start of operation of vehicle 10 and may end after another predetermined period of time has passed. The period of time may also be based on operating characteristics of vehicle 10 as opposed to predetermined times. For example, the period of time may begin when vehicle 10 has reached a first predetermined speed as indicated by wheel speed sensor 34 and end when vehicle 10 falls below a second predetermined speed (which may be the same as the first predetermined speed). It should further be understood that controller 32 may determine values for variables associated with the current operator of vehicle 10 during multiple distinct periods of time. For example, controller 32 may determine values during periods of times spaced at regular intervals between the start and end of operation of vehicle 10 or during any periods of time when the speed of vehicle 10 exceeds a predetermined speed. As indicated in the examples above, it should further be understood that the period(s) of time may or may not have a predetermined length. During the period(s) of time, controller 32 may determine values for each variable at predetermined times within the period of time. For example, controller 32 may determine values for each variable at regular intervals within the period of time or at irregular intervals determined in accordance with an algorithm or formula. To address potential limitations on computational resources for memory 30 and/or controller 32, the period of time may be limited to a set period after operation of vehicle 10 begins. Alternatively, the period of time may extend for the entire time during which vehicle 10 operates, but some values may be discarded over time. For example, in one embodiment controller 32 may be configured to record a predetermined number of values for a given variable. If that number is reached during operation of the vehicle before operation has ended, controller 32 may be configured to discard every other value previously obtained and to continue determining values for the variable until either operation of the vehicle 10 ends or the predetermined number is reached again in which case the process may repeat. In this manner, a sufficient breadth of values is obtained, but computational resources are preserved. Recursive averaging and variance calculations may also be applied to reduce the number of values.

The variables associated with the current operator or vehicle 10 may comprise variables associated with the operation of vehicle 10 by the current operator. In particular, one or more of the variables may comprise operating conditions of vehicle 10 resulting from operation of vehicle 10 by the current operator. For example, one variable may comprise one of a speed of vehicle 10 or an acceleration of vehicle 10 as determined from signals received from wheel speed sensor 34 or acceleration sensor 36, respectively. Another variable may comprise a steer angle of vehicle 10 or an angular acceleration of vehicle 10 as determined from signals received from steer angle sensor 38 or yaw rate sensor 40, respectively. Another variable may comprise a pressure in a tire of vehicle 10 as determined from signals received from tire pressure sensor 42 or a tire pressure monitoring system 50. Another variable may comprise a weight of a load carried by a trailer of vehicle 10 as determined from signals received from load sensor 44. Another variable may comprise a distance or relative speed between vehicle 10 and another vehicle, pedestrian or road infrastructure as determined from signals generated by collision avoidance system 46. Another variable may comprise the absence of traction for vehicle 10 as determined from signals generated by anti-locking braking system and/or stability control system 48. Other variables may comprise distances from lane markers on one or both sides of vehicle 10, the extent of departure from a lane of travel, the side of vehicle 10 departing the lane of travel, the nature of the lane marker (solid or dashed), whether or not a turn signal is in use during lane departure, the frequency of lane departure, and/or the actuation of lane departure warnings determined from signals generated by lane departure warning system 52. Another variable may comprise actuation of steering or braking systems to maintain vehicle 10 within a lane of travel as determined from signals generated by lane keep assist system 54. Other variables may include the position (angle) of the gas pedal in vehicle 10, activation of the brake pedal in vehicle 10, the yaw angle of vehicle 10, the curvature of the road on which vehicle 10 is travelling or the lane of travel on the road, the presence of and/or content (e.g., speed limits) on road signs passed by vehicle 10, the time between activation of a turn signal and crossing of a lane marker, the time between identification of a change in the speed limit and when vehicle 10 reaches the new speed limit, or trends in the speed of vehicle 10 over a section of road or over time. Other variables may relate to the use of a seat belts, turn signals and head lights or other safety feature as determined by monitoring systems for such features. Another variable may comprise the frequency of safety related events as determined by signals generated by system 12 in response to various sensors 26 and systems 28.

The variables associated with the current operator of vehicle 10 may also comprise variables associated with the identity of the current operator or actions or movements of the current operator. In particular, one or more of the variables may comprise a physical feature of the current operator. In accordance one embodiment, the physical features may comprise facial features as determined by signals received by facial recognition system 56 such as distances between various facial components including the eyes, nose, cheekbones and jaw. Other physical features may include the height, weight or skin tone of the operator, some of which (e.g., height and skin tone) may be determined from signals generated by facial recognition system 56 while others (e.g., weight) may be determined from load sensors associated with vehicle seating systems or vehicle 10 generally. Variables associated with the actions or movement of the operator may include head position and orientation (e.g., whether looking forward at the lane of travel of in another direction), eye position, use of seatbelts, hand position (e.g., whether the operator's hands are on or off the steering wheel and whether the hands are located in a proper position when on the steering wheel), the presence or absence of unauthorized personnel in vehicle 10 and actions to disrupt the normal operation of vehicle safety systems as determined by signals generated from system 56.

Depending on the nature of the variables and the sensors 26 and systems 28 providing signals indicative of those variables, controller 32 may determine values for each variable directly from the received signals or may process the signals (alone or in combination) to determine values for certain variables. Controller 32 determines values for at least two variables associated with the current operator of vehicle 10 for purposes of forming multi-dimensional points of a point cloud as discussed further below. It should be understood, however, that controller 32 may determine values for any number of variables greater than two subject to balancing of considerations relating to desired accuracy in identifying changes in operators and computational resources. It should also be understood that, while at least one variable should comprise a variable that is likely to vary during operation of vehicle 10 by the current operator, the other variable could be static or substantially static during the operation of vehicle 10 by the current operator (e.g., certain variables associated with the physical appearance of the operator such as physical features of the operator).

In at least some embodiments, the method may continue with the step 62 of identifying an end of operation of vehicle 10 by the current operator. Identifying the end of operation of vehicle 10 may be required if the period of time during which controller 32 determines values for variables associated with the current operator is dependent on the end of operation of vehicle 10. Identifying the end of operation may also serve as a condition for subsequent steps in the method because, as noted above, an assumption can be made that the end of operation of vehicle 10 establishes an opportunity for a change in the operator of vehicle 10 and, therefore, subsequently determined values for given variables may not relate to the current operator. System 16 may again identify an end of operation of vehicle 10 in a variety of ways. For example, controller 32 may detect a change in state of vehicle 10 such as the deactivation of a power source on vehicle 10 as indicated by a current or voltage sensor or the end of movement of vehicle 10 as indicated by wheel speed sensor 34 or acceleration sensor 36.

After step 62, or after the period of time for determining the values of the variables is otherwise complete, the method may continue with the step 64 of correlating each of the values for one of the variables with corresponding values for other variables to form a plurality of multi-dimensional data points. Controller 32 may correlate the values based on the times they were obtained. In particular, controller 32 may correlate values for variables that are obtained contemporaneously. For example, controller 32 may correlate values for two or more variables that are obtained at the same time. Alternatively, controller 32 may correlate values for two or more variables that are obtained within a predetermined period/range of time. In yet another alternative, controller 32 may correlate a value of one variable with the values of other variables that are nearest in time to the time at which the value of the one variable was obtained. In yet another alternative, controller 32 may correlated a value for one variable with the average of, or an interpolated value between, multiple values for another variable occurring before and after the time the one variable was obtained. In yet another embodiment, multiples values for a variable that is determined relatively frequently (e.g., steering angle) may be associated with the same value for a variable (e.g., intraocular distance) that is measured less frequently under the assumption that less frequently measured variable is unlikely to have changed over time.

Figure 4:
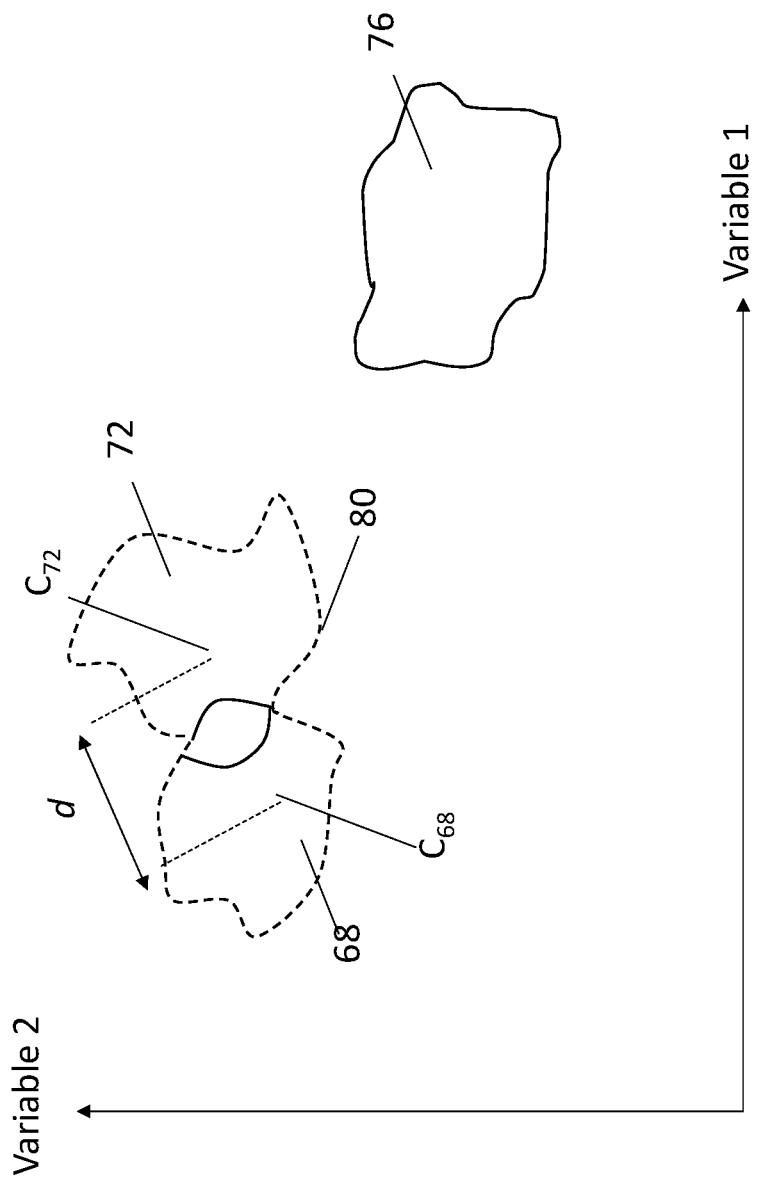
FIG. 4 is a graphical representation of a plurality of two-dimensional point clouds associated with various operators of a vehicle and stored in a memory.

The method may continue with the step 66 of forming a point cloud from the plurality of points generated in step 64. The point cloud may be formed using conventional techniques to those of skill in the art. Referring to FIG. 4, the combination of points will form a point cloud 68 with defined features. In the illustrated embodiment, a two-dimensional point cloud is illustrated based on points formed from values for two different variables associated with the current operator of vehicle 10. It should be understood, however, that the point cloud may have more than two dimensions. As is known in the art, each point cloud will have specific characteristics including, for example, a geometric center, edges, bulges and indentations in the edges, slopes or dips in three-dimensional surfaces, etc.

Referring again to FIG. 3, once the point cloud 68 is formed, the method may continue with the step 70 of performing a comparison of the point cloud 68 to another point cloud—such as point cloud 72 in FIG. 4—that is stored in a memory such as memory 30 and that is associated with a prior operator of vehicle 10. In some embodiments, the prior operator associated with point cloud 72 will be the operator for vehicle 10 during the most recent period of operation of vehicle 10 immediately preceding step 58. Memory 30 may associate individual point clouds in memory 30 with individual operators of vehicle 10 in a conventional data structure such as a look up table. The operators may be identified with information that is unique to a particular operator (e.g., name or unique identifiers (e.g., employee numbers)) if available or information that is more generalized (e.g., a generic label based on the date/time of operation of vehicle 10). The comparison between point clouds 68, 72 may occur in a variety of ways. Referring to FIG. 4, in accordance with one embodiment, controller 32 determines a distance d between geometric centers $C_{68}$, $C_{72}$, of clouds 68, 72. It should be understood, however, that a wide variety of different comparisons could be made. For example, comparisons could be made relating to the distances between other corresponding locations in each cloud 68, 72 such as the average or median position of points in clouds 68, 72 between corresponding features of each cloud 68, 72 (e.g., between the edges of each cloud 68, 72 or between the nearest points or furthest points of each cloud 68, 72) or even different features of each cloud 68, 72 (e.g., between a geometric center of one cloud 68 to an edge of another cloud 72) could be made. The distances could be Euclidean distances, Mahalanobis distances, Haussdorf distances, Chamfer distances, or Manhattan distances. As an addition or alternative to determining distances between the clouds as a whole, distances could be determined along each dimension of the clouds. Comparisons could also be made based on the shapes of the clouds 68, 72 including the dispersion of the clouds 68, 72 (e.g., range, standard deviation, etc.) or the number and form (e.g., height, width, etc.) of certain types of features or slopes of corresponding features. Comparisons could also be made between the time when each point cloud 68, 72 was formed (with point clouds formed nearer in time arguably more likely to represent the same operator).

Referring again to FIG. 3, once the comparison is complete, the method may continue with the step 74 of determining, responsive to the comparison, whether the current operator of vehicle 10 is the prior operator of vehicle 10 in order to determine whether a change in the identity of the operator has occurred. As noted above, in some embodiments the comparison may determine a distance (e.g., d) between corresponding locations in the point clouds 68, 72. Controller 32 may then compare the measured distance to a corresponding predetermined distance to determine whether the measured distance meets a predetermined condition relative to the predetermined distance (e.g., is less than the predetermined distance). If the distance meets the predetermined condition relative to the predetermined distance, controller 32 may determine that the current operator of vehicle 10 and associated with point cloud 68 is the prior operator of vehicle 10 associated with point cloud 72. If the distance does not meet the predetermined condition relative to the predetermined distance, controller 32 may determine that the current operator of vehicle 10 and associated with point cloud 68 is not the prior operator of vehicle 10 associated with point cloud 72. In the embodiment just described, the comparison generates a single value (e.g., distance d), and controller 32 determines whether that single value meets a predetermined condition relative to a predetermined value. The comparison made in step 70, however, may result in generation of a plurality of values including, for example, multiple distance values between corresponding points on clouds 68, 72, distance values relating to each dimension in the clouds 68, 72, and/or multiple values indicative of similarities or differences in the shapes of point clouds 68, 72. Controller 32 may, in step 74, compare a subset or all of these values against corresponding predetermined values and may make the determination in step 74 based on whether a percentage (e.g., more than half) of the values meet predetermined conditions relative to corresponding predetermined values or based on a weighted formula that provides different weights to each value meeting a predetermined condition relative to corresponding predetermined value. The predetermined values may be established through testing based on data collected from a plurality of different operators of a vehicle 10.

If controller 32 determines that the current operator of vehicle 10 associated with point cloud 68 is the prior operator of vehicle 10 associated with point cloud 72, controller 32 may associate point cloud 68 with the prior operator of vehicle 10 in memory 30. The information gathered by controller 32 and reflected in point cloud 68 may then be used by fleet managers to assess the performance of the operator of vehicle 10, correct and/or rewarding operator behavior and tailor operator education and training because fleet managers will have greater confidence in the association between the data and a particular operator. A determination that the current operator of vehicle 10 associated with point cloud 68 is the prior operator of vehicle 10 associated with point cloud 72 may also have a number of practical effects relating to operation of vehicle 10. For example, system 12, or device 24 may record an event rate indicative of safety related events occurring during operation of vehicle 10 by the operator. The determination that the same operator is associated with point clouds 68, 72 may result in a change in the event rate associated with the operator within system 12. This change in event rate may then be communicated to other vehicle systems. Depending on whether the change in the event rate indicates an improvement or worsening in operator safety, automated warnings resulting from various actions by the operator may be issued later or earlier in time, respectively, or with less or more intensity or frequency, respectively, than they were previously in response to similar actions of the operator. For example, collision avoidance system 46 may generate warnings at smaller or greater distances between vehicle 10 and other vehicles pedestrians and road infrastructure. Tire pressure monitoring system 50 may generate warnings at lower or higher tire pressures than it did previously. Lane departure warning system 52 may generate warnings at smaller or greater distances of vehicle 10 from a lane marker. Similarly, assistance provided by automated driver assistance systems may be reduced or increased depending on whether the change in event rate indicates an improvement or worsening, respectively, in operator safety. For example, lane keep assist system 54 may decrease or increase the level of assistance applied to steering vehicle 10 depending on whether the change in event rate indicates an improvement or worsening, respectively, in operator safety. If controller 32 determines that the current operator of vehicle 10 is not the prior operator of vehicle 10, system 12 may log a safety event and associate that event with the prior operator if circumstances where a change in operator should not have occurred. Controller 32 may also create a new record or identifier in memory 30 for the current operator and associate point cloud 68 with the current operator.

Figure 5:
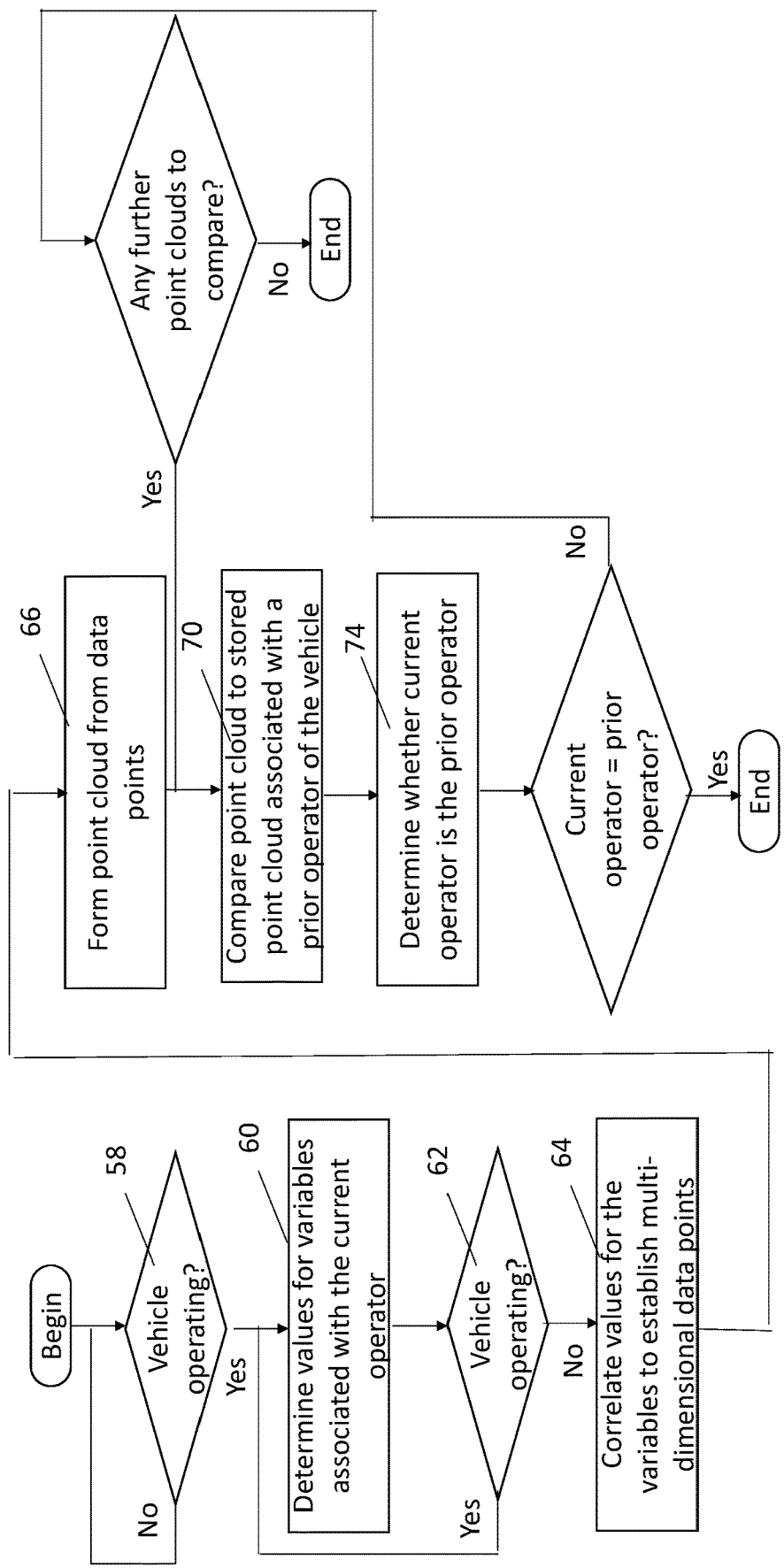
FIG. 5 is a flowchart illustrating another embodiment of a method for identifying a change in the operator of a vehicle in accordance with the present teachings.

In the above-described embodiment, controller 32 performs a comparison in step 70 between the point cloud 68 associated with the current operator of vehicle 10 and a single point cloud 72 associated with a prior operator of vehicle 10 to determine whether there has been change in the identity of the operator of vehicle 10. In some embodiments, however, controller 32 may further seek to identify the current operator of vehicle 10 by repeating steps 70, 74 to compare point cloud 68 against multiple point clouds stored in memory 30 and associated with different prior operators of vehicle 10. Referring now to FIG. 5, if controller 32 determines in step 74 that the current operator associated with point cloud 68 is not the prior operator associated with point cloud 72, controller 32 may then repeat step 70 and perform a comparison between point could 68 and another point cloud—such as point cloud 76 in FIG. 4—that is associated with a different prior operator. Thereafter, controller 32 may determine in step 74, based on this comparison, if the current operator of vehicle 10 is the prior operator of vehicle 10 associated with point cloud 76. Controller 32 may repeat steps 70, 74 until the earlier of (i) a determination by controller 32 that the current operator of vehicle 10 associated with point could 68 is a prior operator or vehicle 10 associated with another point cloud in memory 30 or (ii) controller 32 has performed steps 70, 74 for each point cloud in memory 30 (in which case controller 32 may create a new record or identifier for the current operator and associate point cloud 68 with the current operator). In an alternative embodiment, controller 32 may perform comparisons of point cloud 68 to all of the point clouds 72, 76 in memory 30 in step 70 prior to making a determination in step 74 whether the current operator of vehicle 10 is one of the prior operators of vehicle 10 associated with the point clouds 72, 76 stored in memory 30. In this embodiment, controller 32 may determines in step 74 which of the prior operators associated with the point clouds 72, 76 in memory 30 is most likely to be the current operator of vehicle 10 and associated with point cloud 68. For example, in the case where the comparisons in step 70 generate distances between corresponding locations in point cloud 68 and point clouds 72, 76, controller 32 may determine that the current operator is the prior operator associated with the point cloud among clouds 72, 76 having the smallest distance relative to point cloud 68 associated with the current operator.

Figure 6:
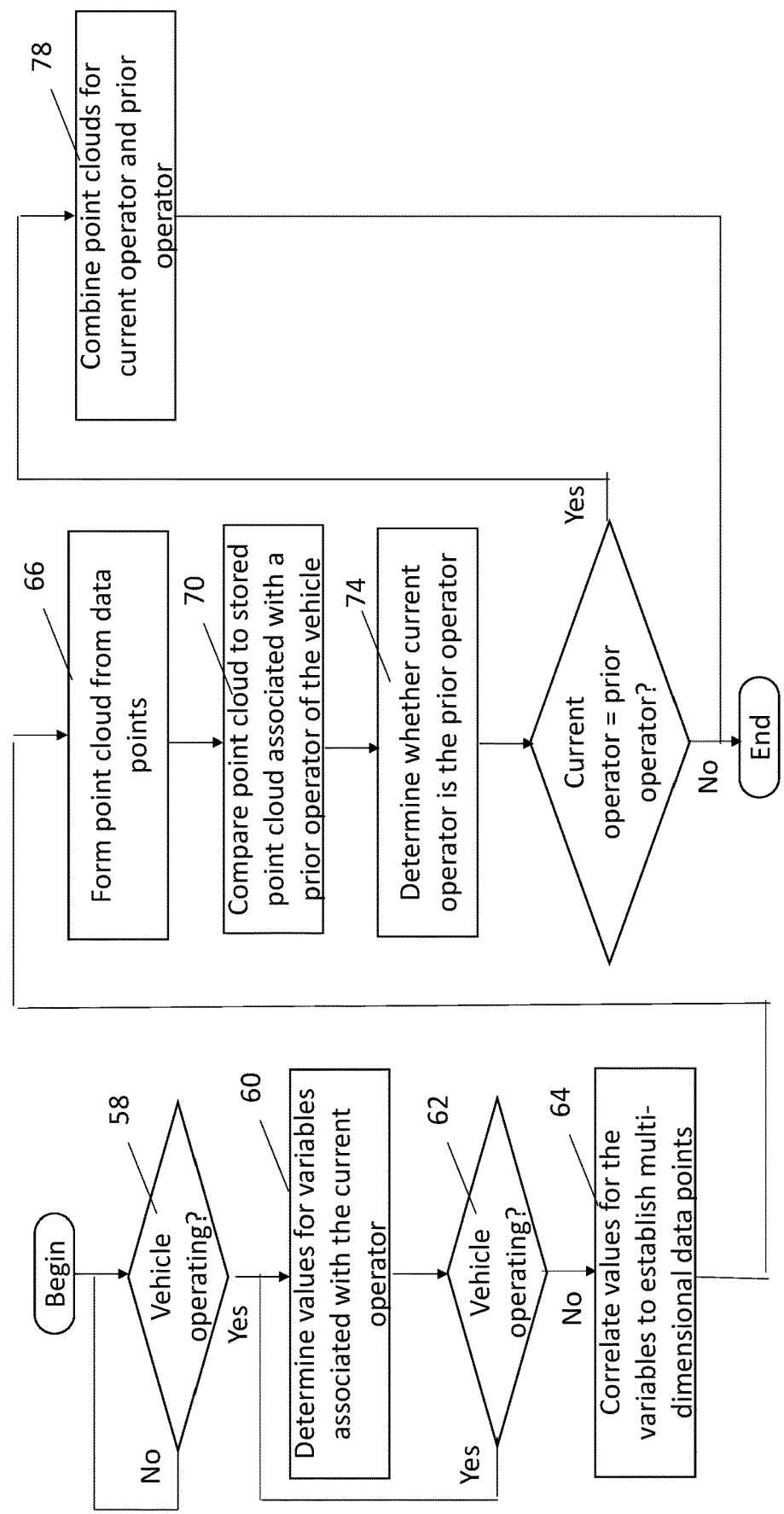
FIG. 6 is a flowchart illustrating another embodiment of a method for identifying a change in the operator of a vehicle in accordance with the present teachings.

Referring now to FIG. 6, if controller 32 determines that the current operator of vehicle 10 is a prior operator of vehicle 10, controller 32 may also, in some embodiments, perform the additional step 78 of combining point clouds 68, 72 into a single point cloud 80 that is identified in FIG. 4 as the area within the dashed lines and that will be associated with the current operator of vehicle 10 in memory 30. The larger amount of data in the combined point cloud 80 should, in theory, allow for more accurate future iterations of the method.

Figure 7A:
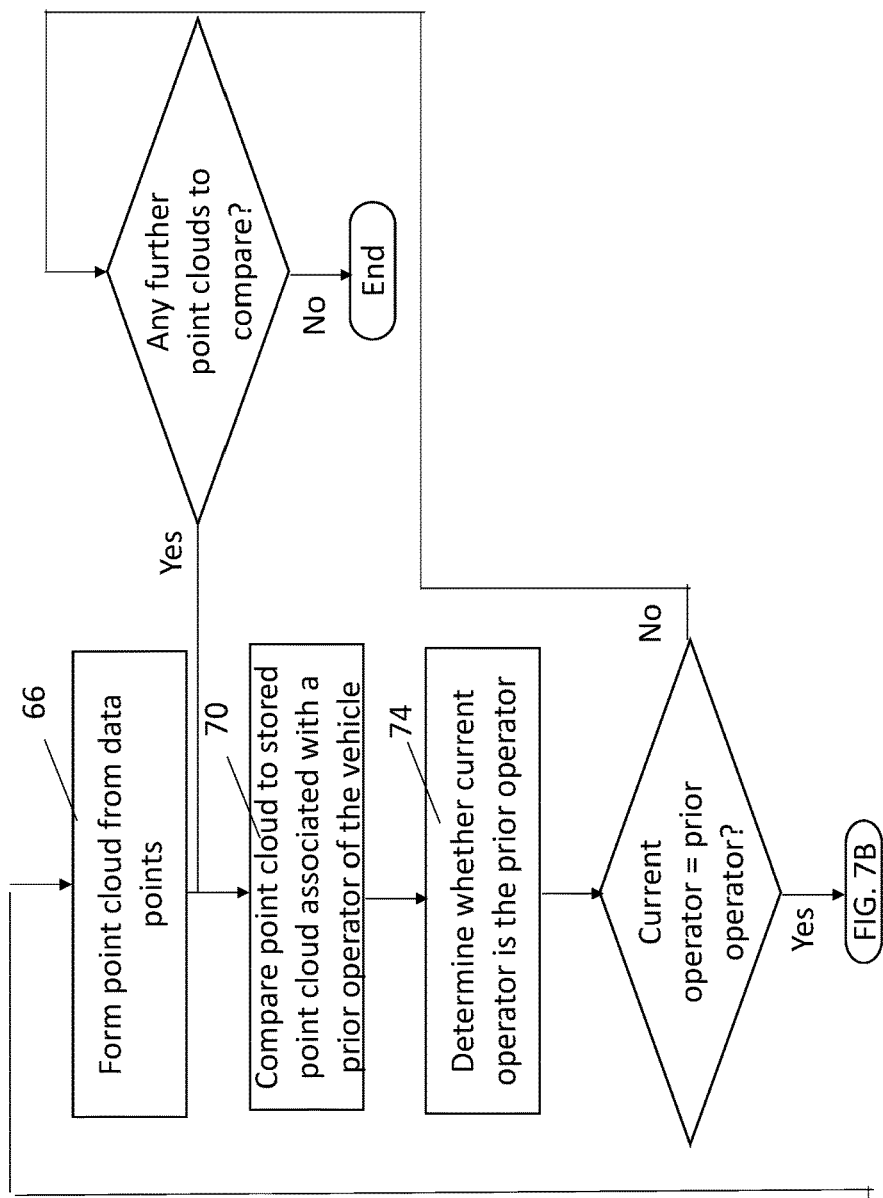
FIGS. 7A-B are flowcharts illustrating another embodiment of a method for identifying a change in the operator of a vehicle in accordance with the present teachings.
Figure 7A:
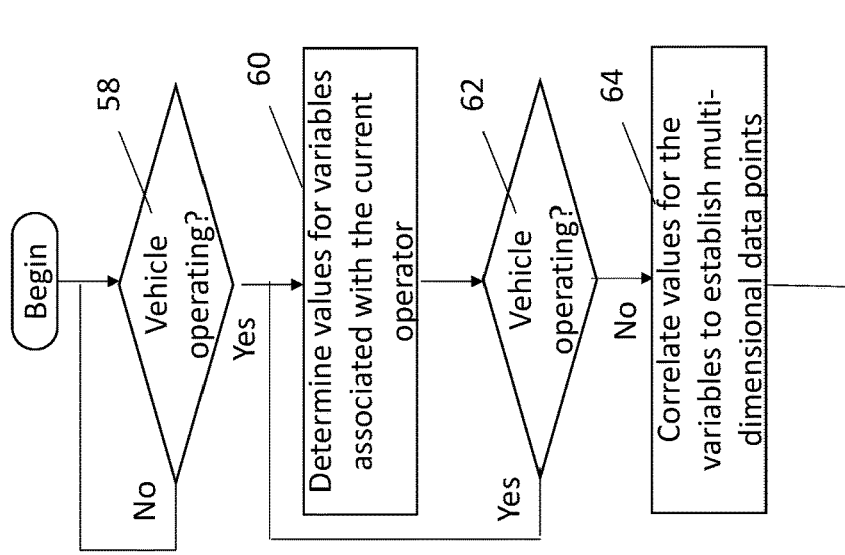
Figure 7B:
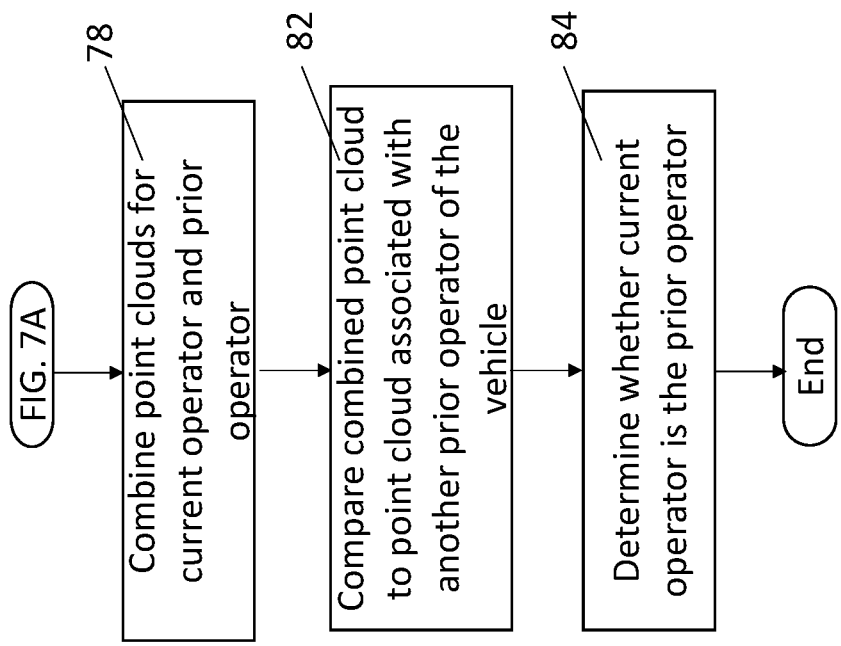

Referring now to FIGS. 7A-B, in yet another embodiment, the combined point cloud 80 may be used as part of an iterative process to reevaluate earlier determinations made in step 74. Referring again to FIG. 4, controller 32 may, for example, initially perform a comparison of point clouds 68, 76 in step 70 and determine, in step 74, that the current operator of vehicle 10 associated with point cloud 68 is not the prior operator of vehicle 10 associated with point cloud 76. Thereafter, controller 32 may repeat steps 70, 74 to perform a comparison of point clouds 68, 72 and determine that the current operator of vehicle 10 associated with point cloud 68 is the prior operator of vehicle 10 associated with point cloud 72. Following this determination, controller 32 may combine point clouds 68, 72 in step 78 into combined point cloud 80. Thereafter, controller 32 may implement the steps 82, 84 in which controller 32 performs a comparison of the combined point cloud 80 and point cloud 76 and determines, responsive to the comparison, whether the current operator of vehicle 10 and associated with the combined point cloud 80 is the prior operator of vehicle 10 associated with point cloud 76. Controller 32 may perform steps 82, 84, in substantially the same manner as steps 70, 74 discussed above. In this manner, controller 32 may determine that the current operator of vehicle 10 is the prior operator of vehicle 10 associated with point cloud 76 despite the earlier determination that the two operators were not the same.

Figure 8B:
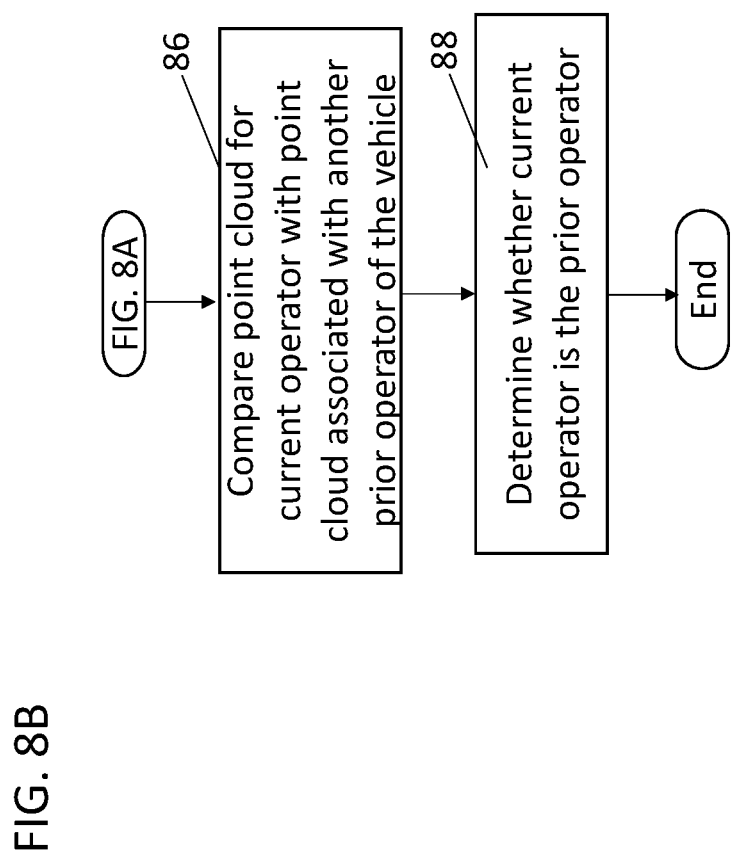

Referring now to FIGS. 8A-B, in yet another embodiment, controller 32 may be configured to re-evaluate prior determinations made in step 74 based on the results of subsequent iterations of the method. Referring to FIG. 4, point clouds 68, 76, 72 may be generated successively over time as the vehicle is operated by various operators such that point cloud 68 is the first point cloud generated, point cloud 76 is the second point cloud generated and point cloud 72 is the third point cloud generated. During a first iteration of the method following generation of the second point cloud 76 by an operator of vehicle 10, controller 32 may compare, in step 70, the second point cloud 76 for the then current operator of vehicle 10 to the first point could 68 for a prior operator of vehicle 10 and determine, in step 74, that the then current operator associated with second point cloud 76 is not the prior operator associated with the first point cloud 68. Subsequent operation of vehicle 10 by an operator of vehicle 10 may then result in generation of the third point cloud 72. In a second iteration of the method following generation of the third point cloud 72 by an operator of vehicle 10, controller 32 may compare, in step 70, the third point cloud 72 for the current operator of vehicle 10 to the second point could 76 for the prior operator of vehicle 10 and determine, in step 74, that the current operator associated with the third point could 72 is the prior operator associated with second point cloud 76. In order to test the determinations made in each iteration of the method, controller 32 may perform the additional step 86 of comparing the third point cloud 72 associated with the current operator of vehicle 10 with the first point cloud 68 and the step 88 of determining whether the current operator associated with the third point cloud 72 is the prior operator associated with the first point cloud 68. Based on the results of the prior comparisons of point clouds 68 and 76 (i.e., not the same operator) and of point clouds 72 and 76 (i.e., the same operator) described above, controller 32 should, in theory, determine that the current operator associated with the third point cloud 72 is not the prior operator associated with the first point cloud 68. If controller 32 does, in fact, determine that the current operator associated with the third point cloud 72 is not the prior operator associated with the first point cloud 68, this determination reinforces the earlier determinations regarding the change in identity of the operators as between the operators associated with point clouds 68 and 76 and the lack of change in the operators as between the operators associated with point clouds 76 and 72. If, on the other hand, controller 32 determines that the current operator associated with the third point cloud 72 is the prior operator associated with first point cloud 68, this determination calls into question the prior determination that a change the identity of the operator occurred when the second point cloud 76 was generated and the determination that a change in identity of the operator did not occur when the third point cloud 72 was generated. As a result, controller 32 may, in certain embodiments, discard some or all of the data or flag the data for further review. In the example described above, the determination in step 74 that a current operator was the prior operator leads to the subsequent comparisons and determinations in steps 86, 88 for the purpose of verifying the conclusions reached in the current and prior iterations of step 74. It should be understood, however, that a determination in step 74 that the current operator is not the prior operator could alternatively, or in addition, lead to similar comparisons and determinations for the purpose of verifying the conclusions reached in the current and prior iterations of step 74.

A system 16 and method for identifying a change in the operator of a vehicle 10 in accordance with the present teachings represents an improvement as compared to conventional systems and methods. In particular, the system 16 and method are not dependent on operator use of paper or electronic logging devices to identify changes in the driver. The system 16 and method also allow identification of a change in the operator in vehicles where electronic logging devices and/or or biometric identification systems are not available or have been disabled.

While the invention has been shown and described with reference to one or more particular embodiments thereof, it will be understood by those of skill in the art that various changes and modifications can be made without departing from the spirit and scope of the invention.

What is claimed is:

1. A system for identifying a change in the operator of a vehicle, comprising:
a memory; and,
a controller configured to
determine, during operation of the vehicle by a current operator of the vehicle over a period of time, a plurality of values for a first variable associated with the current operator;
determine, during operation of the vehicle by the current operator of the vehicle over the period of time, a plurality of values for a second variable associated with the current operator;
correlate each of the plurality of values for the first variable with a corresponding value of the plurality of values for the second variable to form a plurality of data points, the plurality of data points forming a first point cloud associated with the current operator;
perform a comparison between the first point cloud and a second point cloud stored in the memory, the second point cloud associated in the memory with a first prior operator of the vehicle; and,
determine, responsive to the comparison, whether the current operator of the vehicle is the first prior operator of the vehicle.

2. The system of claim 1 wherein the controller is further configured to:
determine, during operation of the vehicle by the current operator of the vehicle over the period of time, a plurality of values for a third variable associated with the current operator; and
correlate each of the plurality of values for the first variable with both the corresponding value of the plurality of values for the second variable and a corresponding value of the plurality of values for the third variable to form the plurality of data points in the first point cloud.

3. The system of claim 1 wherein the controller is further configured to combine the first and second point clouds into a combined point cloud if the current operator of the vehicle is the first prior operator of the vehicle.

4. The system of claim 1 wherein the controller is further configured to:
perform a comparison between the first point cloud and a third point cloud stored in the memory, the third point cloud associated in the memory with a second prior operator of the vehicle; and,
determine, responsive to the comparison between the first point cloud and the third point cloud, whether the current operator of the vehicle is the second prior operator of the vehicle.

5. The system of claim 1 wherein the controller is further configured, in performing the comparison between the first point cloud and the second point cloud, to compare a first time when the first point cloud was formed and a second time when the second point cloud was formed.

6. The system of claim 1 wherein the controller is further configured, in performing the comparison between the first point cloud and the second point cloud, to determine a distance between a geometric center of the first point cloud and a geometric center of the second point cloud.

7. The system of claim 1 wherein at least one of the first and second variables comprises a physical feature of the current operator.

8. The system of claim 1 wherein at least one of the first and second variables comprises an operating condition of the vehicle resulting from operation of the vehicle by the current operator.

9. The system of claim 1 wherein the controller determines the plurality of values for the first variable at predetermined times within the period of time.

10. The system of claim 1 wherein the controller is further configured, if the controller determines that the current operator of the vehicle is not the first prior operator of the vehicle, to:
perform a comparison between the first point cloud and a third point cloud stored in the memory, the third point cloud associated in the memory with a second prior operator of the vehicle;
determine, responsive to the comparison between the first point cloud and the third point cloud, whether the current operator of the vehicle is the second prior operator of the vehicle;
combine, if the controller determines the current operator of the vehicle is the second prior operator of the vehicle, the first point cloud and the third point cloud into a combined point cloud;
perform a comparison between the combined point cloud and the second point cloud; and,
determine, responsive to the comparison between the combined point could and the third point cloud, whether the current operator of the vehicle is the first prior operator of the vehicle.

11. The system of claim 1 wherein the controller is further configured to:
identify, prior to the period of time, a start of operation of the vehicle by the current operator; and,
identify, prior to correlating each of the plurality of values for the first variable with the corresponding value of the plurality of values for the second variable, an end of operation of the vehicle by the current operator.

12. An article of manufacture, comprising:
a non-transitory computer storage medium having a computer program encoded thereon that when executed by a controller identifies a change in the operator of a vehicle, the computer program including code for
determining, during operation of the vehicle by a current operator of the vehicle over a period of time, a plurality of values for a first variable associated with the current operator;
determining, during operation of the vehicle by the current operator of the vehicle over the period of time, a plurality of values for a second variable associated with the current operator;
correlating each of the plurality of values for the first variable with a corresponding value of the plurality of values for the second variable to form a plurality of data points, the plurality of data points forming a first point cloud associated with the current operator;
performing a comparison between the first point cloud and a second point cloud stored in a memory, the second point cloud associated in the memory with a first prior operator of the vehicle; and,
determining, responsive to the comparison, whether the current operator of the vehicle is the first prior operator of the vehicle.

13. The article of manufacture of claim 12 wherein the computer program includes code for:
performing a comparison between the first point cloud and a third point cloud stored in the memory, the third point cloud associated in the memory with a second prior operator of the vehicle; and,
determining, responsive to the comparison between the first point cloud and the third point cloud, whether the current operator of the vehicle is the second prior operator of the vehicle.

14. The article of manufacture of claim 12 wherein at least one of the first and second variables comprises a physical feature of the current operator.

15. The article of manufacture of claim 12 wherein at least one of the first and second variables comprises an operating condition of the vehicle resulting from operation of the vehicle by the current operator.

16. The article of manufacture of claim 12 wherein the computer program includes code for:
identifying, prior to the period of time, a start of operation of the vehicle by the current operator; and,
identifying, prior to correlating each of the plurality of values for the first variable with the corresponding value of the second plurality of values for the second variable, an end of operation of the vehicle by the current operator.

17. A method for identifying a change in the operator of a vehicle, comprising the steps of:
determining, during operation of the vehicle by a current operator of the vehicle over a period of time, a plurality of values for a first variable associated with the current operator;
determining, during operation of the vehicle by the current operator of the vehicle over the period of time, a plurality of values for a second variable associated with the current operator;
correlating each of the plurality of values for the first variable with a corresponding value of the plurality of values for the second variable to form a plurality of data points, the plurality of data points forming a first point cloud associated with the current operator;
performing a comparison between the first point cloud and a second point cloud stored in a memory, the second point cloud associated in the memory with a first prior operator of the vehicle; and,
determining, responsive to the comparison, whether the current operator of the vehicle is the first prior operator of the vehicle.

18. The method of claim 17, further comprising the steps of:
performing a comparison between the first point cloud and a third point cloud stored in the memory, the third point cloud associated in the memory with a second prior operator of the vehicle; and,
determining, responsive to the comparison between the first point cloud and the third point cloud, whether the current operator of the vehicle is the second prior operator of the vehicle.

19. The method of claim 17 wherein at least one of the first and second variables comprises a physical feature of the current operator.

20. The method of claim 17 wherein at least one of the first and second variables comprises an operating condition of the vehicle resulting from operation of the vehicle by the current operator.

* * * * *